(No Model.) 2 Sheets—Sheet 2.

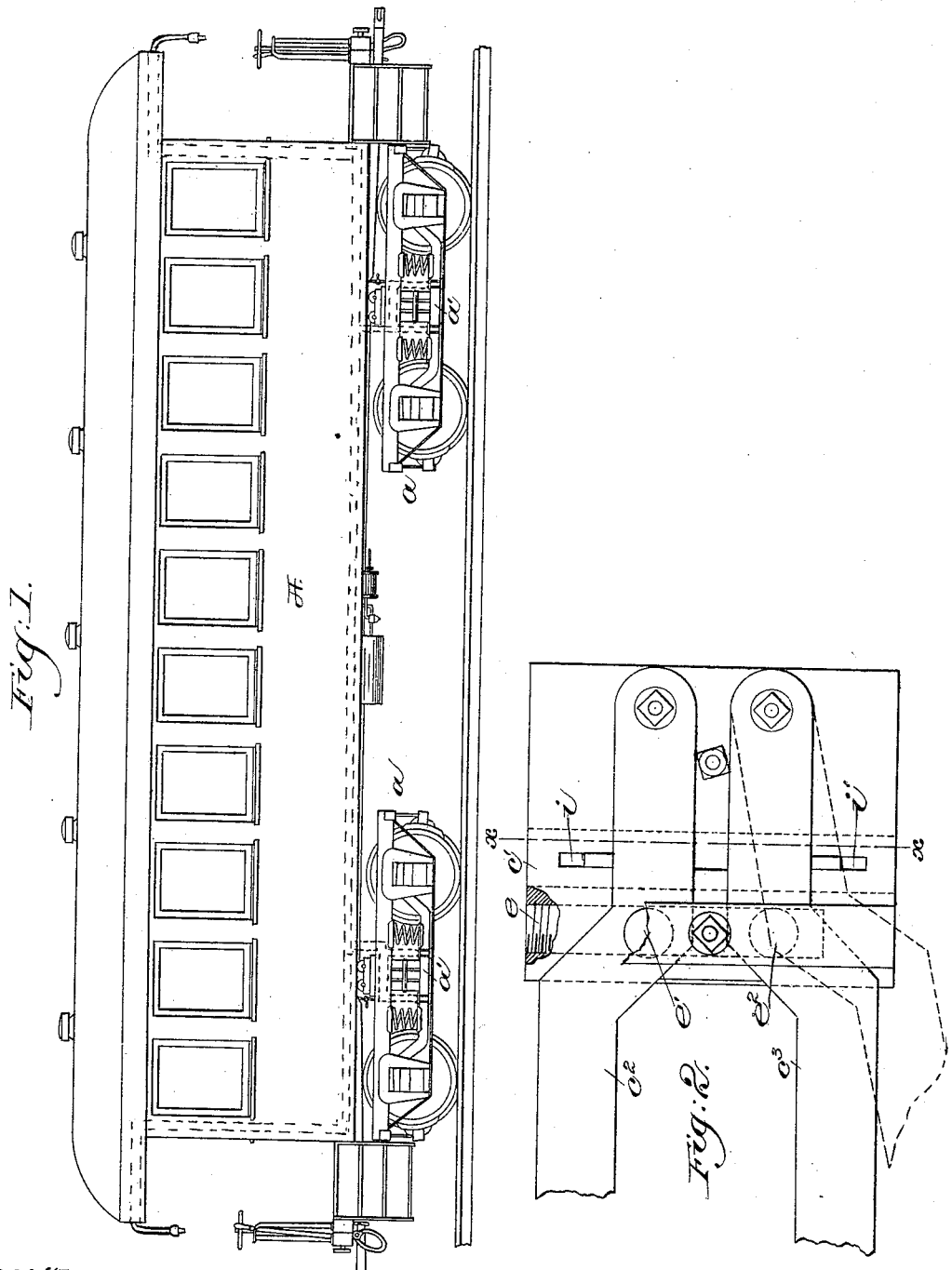

G. B. LEHY.

AIR BRAKE ATTACHMENT.

No. 381,392. Patented Apr. 17, 1888.

Witnesses.
Fred. S. Greenleaf.
Fred L. Emery.

Inventor.
Geoffrey B. Lehy.
By Emery Gregory
attys.

UNITED STATES PATENT OFFICE.

GEOFFREY B. LEHY, OF BOSTON, MASSACHUSETTS.

AIR-BRAKE ATTACHMENT.

SPECIFICATION forming part of Letters Patent No. 381,392, dated April 17, 1888.

Application filed June 28, 1887. Serial No. 212,736. (No model.)

*To all whom it may concern:*

Be it known that I, GEOFFREY B. LEHY, of Boston, county of Suffolk, and State of Massachusetts, have invented an Improvement in Devices for Detecting Broken Axles, Journals, Wheels, and Rails, of which the following description, in connection with the accompanying drawings, is a specification, like letters on the drawings representing like parts.

This invention has for its object to provide means for automatically controlling the application of the brakes upon the occurrence of a broken journal, axle, or wheel of any car of a railway-train.

In accordance with this invention two controlling-levers are connected to an actuating-bar, which is secured to the equalizer-bar or other component part of the truck at one side of the car-truck, and another actuating-bar is secured to the opposite equalizer-bar of the truck, which is of suitable length and shape to enter between the said controlling-levers and to engage one or the other lever whenever one of the equalizer-bars, or that end of said bar nearest to which the actuating-bar is attached, falls below the plane of the other, as it would do upon the occurrence of a broken rail, wheel, or journal. The said controlling-levers control the escape of air from the usual air-reservoir which is employed to operate the brakes, and whenever one or the other controlling-lever is moved sufficiently the air escapes, thereby applying the brake. Each truck of a car may be fully equipped with the devices above enumerated—that is to say, a pair of controlling-levers may be employed in connection with each pair of wheels. An equivalent bar may be substituted for the equalizer-bar, it being arranged to bear upon the journals of the wheels substantially like the equalizer-bar; but it may not have any other function.

Figure 3:
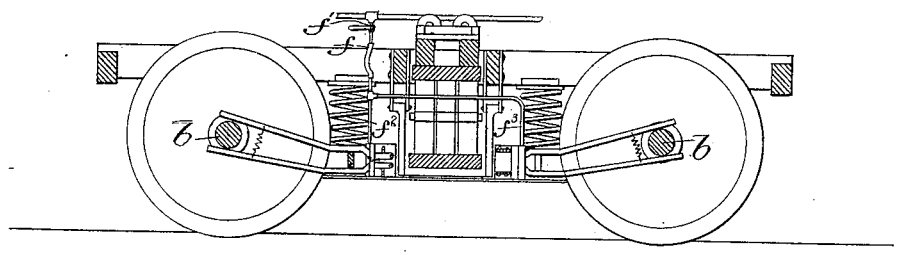

Figure 1 shows in side elevation a car provided with devices for controlling the application of the brake upon the occurrence of a broken journal, axle, wheel, or rail in accordance with this invention; Fig. 2, a plan view of a portion of the controlling-levers; Fig. 3, a horizontal section of one of the trucks of the car, taken on the dotted line $y\ y$, Fig. 4; and Fig. 4, a top view of one of the trucks of the car shown in Fig. 1.

The car-body A is of any usual construction, and is provided with usual trucks, $a$, having equalizer-bars $a'$, which rest upon the journal-boxes of the axles $b$. Whenever a car passes over a broken rail, the broken end sags by the weight of the car, and the wheel in passing over falls below the level of the opposite wheel suddenly, thereby causing one end of the equalizer-bar to drop below the plane or level of the opposite equalizer. So, also, upon the occurrence of a broken journal or axle, and in most instances upon the occurrence of a broken wheel, the equalizer-bar will move in substantially the same manner.

In the present instance I have secured to one of the equalizer-bars at a right angle an actuating-bar, $c$, which is provided at its end with a box or frame, $c'$, and upon the face of said box or frame $c'$ two controlling-levers, $c^2\ c^3$, are pivoted. The two controlling-levers $c^2\ c^3$ extend parallel with the equalizer-bar and are of sufficient length to receive between their outer ends the axle $b$. Another actuating-bar, $d$, is secured to the other or opposite equalizer-bar opposite the actuating-bar $c$, and the bar $d$ is herein shown as having fixed to its outer end a bent arm, $d'$, which enters between but does not touch the two controlling-levers $c^2\ c^3$, being prevented from touching by a block or plate, 50. It will be seen that whenever either end of one or the other equalizer-bar falls below the plane of the opposite equalizer-bar one of the controlling-levers $c^2$ or $c^3$ will be moved by movement of that actuating-bar which is connected with the falling equalizer.

The bar or frame $c'$ is recessed, as at $e$, forming an air-chamber, and is provided with two openings, $e'\ e^2$, (see dotted lines, Fig. 2,) communicating with said recess, which openings are usually closed, respectively, by the controlling-lever $c^2\ c^3$. A pipe, $f$, having a valve, $f'$, is connected with the usual air-reservoir beneath the car, and said pipe is connected by a pipe, $f^2$, with the recess in the box or frame $c'$. Normally the valve $f'$ will be open, so that compressed air fills the recess contained in the box $c'$, and whenever one or the other controlling-lever $c^2$ or $c^3$ is moved the respective opening, $e'$ or $e^2$, is exposed and the air escapes from the reservoir, thereby applying the brakes in usual manner.

Figure 4:
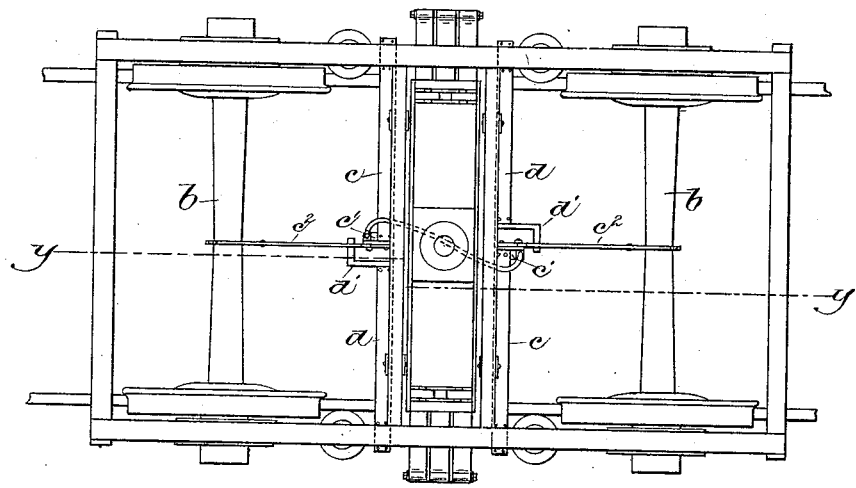

Ordinarily each truck will be provided with two sets of controlling-levers and actuating-bars, as shown in Fig. 4, in which instance the pipe $f$ will have two branches, $f^2 f^3$—one for each box or frame $c'$.

Each car of the train may be fully equipped with the devices above mentioned; or for some uses only one set or pair may be placed upon each car; or, if desired, one car of each train may be provided with a set or pair—such, for instance, as the baggage-car.

By extending the controlling-levers forward to engage the axle, as shown and described, should the axle break or bend, so as to rock and revolve out of its true axial center, the said levers will also be moved.

I claim—

1. In an air-brake attachment, an actuating-bar carried by one of the equalizer-bars of the truck and a pair of separable controlling-levers carried by said actuating-bar, combined with another actuating-bar carried by the opposite equalizer-bar of said truck, the outer end of which enters between the said controlling-levers, which latter by their movement control the application of the brakes, substantially as described.

2. In an air-brake attachment, two equalizing-bars of the truck, combined with two actuating-bars carried, respectively, by the equalizer-bars, and means, substantially as described, controlled by said actuating-bars for applying the brakes whenever one end of one of said equalizer-bars falls below the level of the opposite equalizer-bar, substantially as described.

3. In an air-brake attachment, the actuating-bars $c\ d$, carried by the equalizer-bars, and the separable controlling-levers, combined with a box or frame, $c'$, recessed, as described, and having the openings normally closed by said controlling-levers, and a conduit between said boxes $c'$ and the air-reservoir, substantially as described.

4. The actuating-bar $c'$, combined with the controlling-lever $c^2\ c^3$ and the axle $b$, passing between the outer ends of the controlling-levers, and means, substantially as described, controlled by the lever $c^2\ c^3$ for applying the brakes whenever said levers are moved, substantially as described.

5. In an air-brake attachment, an air-escape pipe or conduit leading from the air pipe or cylinder of the air-brake, combined with two controlling-levers for said conduit, said controlling-levers embracing the axle, and means, substantially as described, carried by the equalizer-bars of the truck for effecting the operation of the said controlling-levers, as and for the purposes set forth.

In testimony whereof I have signed my name to this specification in the presence of two subscribing witnesses.

GEOFFREY B. LEHY.

Witnesses:
 BERNICE J. NOYES,
 B. DEWAR.